F. E. LESTER.
MACHINE FOR PREPARING FRUIT FOR DRYING.
APPLICATION FILED AUG. 11, 1919.
1,345,607. Patented July 6, 1920.
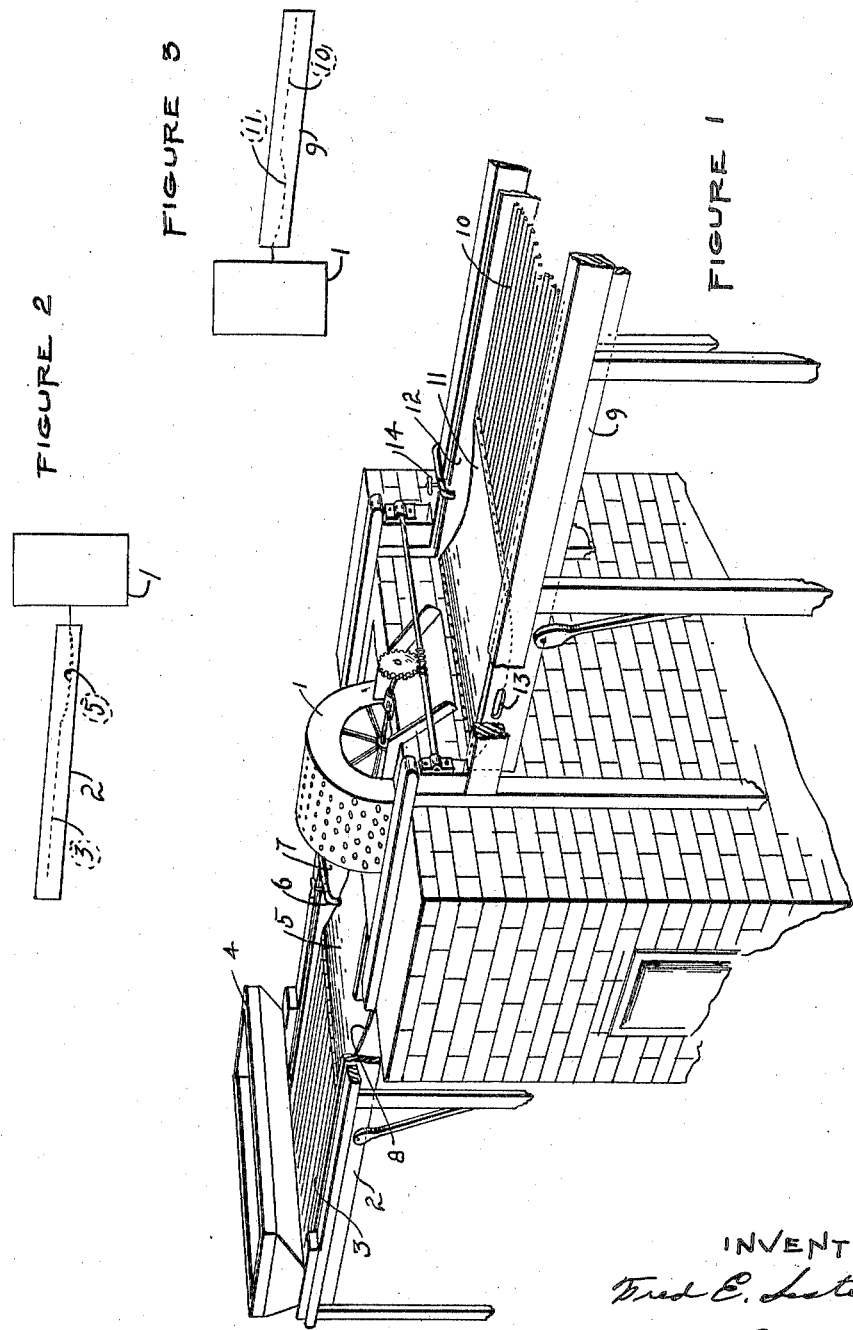
INVENTOR
Fred E. Lester
BY John A. Naismith
HIS ATTORNEY

UNITED STATES PATENT OFFICE.

FRED E. LESTER, OF NEAR SAN JOSE, CALIFORNIA.

MACHINE FOR PREPARING FRUIT FOR DRYING.

1,345,607.  Specification of Letters Patent.  Patented July 6, 1920.

Application filed August 11, 1919. Serial No. 316,777.

*To all whom it may concern:*

Be it known that I, FRED E. LESTER, a citizen of the United States, and residing near San Jose, in Santa Clara county, in the State of California, have invented certain new and useful Improvements in Machines for Preparing Fruit for Drying, of which the following is a specification.

My invention relates particularly to means employed in the treatment of prunes for preparing the same for drying.

It is known that dipped fruit has been subjected to a washing process after being dipped, but this washing process has heretofore required the use of a separate tank and additional and somewhat complicated mechanical manipulation.

It is the object of my invention to provide a simple, automatically operated means for washing the prunes after dipping, and may also include a washing means for the prunes before dipping.

In the drawing:—

Figure 1 is a perspective view of a portion of a machine of the character indicated embodying two of the devices forming the basis of this invention.

Fig. 2 is a diagrammatical illustration showing one of the devices positioned to discharge into the dipper of the machine.

Fig. 3 is a diagrammatical illustration showing one of the devices positioned to receive from the dipper of the machine.

Referring more particularly to the drawing, 1 indicates a dipper of the usual type through which the prunes are passed in order to subject them to the action of a lye solution, which treament causes their skins to crack and therefore facilitates the drying process. At 2 is shown a common form of shaker frame operated in the usual way by means of power mechanism not shown and having the usual form of screen positioned therein as at 3 and a hopper 4 positioned thereover.

In my improved form of the machine I insert a shallow pan 5 in that portion of the shaker frame adjacent dipper 1, the same being gently curved from the screen 3 to the dipper 1 so that prunes moved along screen 3 by the shaking of frame 2 will be carried off of said screen on to the pan 5 and gradually moved across the same into dipper 1. At 6 I show a water-cock connected to a source of water supply not shown and, when the machine is in operation, discharging a continuous flow of water into pan 5, the said pan 5 being closed at one end 7 but having an opening at end 8 whereby the water may readily flow away.

Upon the discharge side of dipper 1 is shown another shaker frame 9 mounted to operate in the usual way by means of power mechanism not shown. This frame also is ordinarily provided with a screen as 10 and sometimes certain other devices for handling fruit. In my improved form of the machine I insert a shallow pan 11, similar to pan 5, in frame 9 at the receiving end thereof so that fruit from dipper 1 will be discharged directly into pan 11, the shaking movement of the frame 9 gradually moving the fruit forwardly to the screen portion 10 and such other devices as may be arranged thereon or thereafter. This pan 11 is also preferably closed at one end 12 and provided with a discharge opening at the opposite end as at 13, water being fed into the pan in any desired quantity by means of a water-cock 14 connected to any suitable source of supply not shown.

When the embodiment herein shown and described is in operation the prunes are deposited on screen 3 through hopper 4. The shaker movement of frame 2 causes the fruit to move slowly forward into pan 5, a large portion of the dirt, leaves, twigs, etc., being sifted out through screen 3. As the fruit slowly moves through pan 5 to dipper 1 the major part of the remaining dirt, etc. is washed away and the prunes are delivered to the dipper 1 in a clean condition for the lye treatment.

The desired action of the lye solution on the fruit is secured while the said fruit is passing through the dipper 1, and therefore it is desirable to wash this solution from the fruit before drying. In the embodiment of my invention shown the fruit is discharged directly from the dipper 1 into the pan 11, the shaking movement of frame 9 causing the same to move slowly through the running water therein to screen 10 thereby thoroughly washing the same before any subsequent operations are performed preparatory to drying. In the present case the pan is provided with a bottom having a smooth, curved contour over which the fruit moves and the water is caused to flow across the pan at right angles to the movement of the fruit.

Inasmuch as the invention herein disclosed resides in the arrangement of a shallow shaking washer in operative relation to a dipper, it is clear that a single washer may be provided at the discharge side of the dipper as shown in Fig. 3, or at the receiving side of the dipper as shown in Fig. 2 without departing from the spirit of my invention. It is understood that changes in form, construction, proportion and method of operation may be made within the scope of the appended claim.

I claim:—

The combination with a machine for preparing fruit for drying including a dipper and a shaker device including screening means operatively mounted with relation to each other, of a fruit washing means comprising a shallow pan rigidly mounted on said shaker device adjacent said dipper and provided with a bottom curved in the direction of movement of the fruit passing thereover, means for discharging water into said pan and means for permitting the discharge of water from said pan whereby said water is caused to move over said pan with the movement of fruit passing thereover.

FRED E. LESTER.